US010444509B2

(12) United States Patent
Ries (10) Patent No.: US 10,444,509 B2
(45) Date of Patent: Oct. 15, 2019

(54) NEAR EYE DIFFRACTIVE HOLOGRAPHIC PROJECTION METHOD (71) Applicant: DAQRI, LLC, Los Angeles, CA (US)

(72) Inventor: Ryan Ries, La Canada, CA (US)

(73) Assignee: DAQRI, LLC, Los Angeles, CA (US)

( * ) Notice: Subject to any disclaimer, the term of this patent is extended or adjusted under 35 U.S.C. 154(b) by 142 days.

(21) Appl. No.: 15/635,025

(22) Filed: Jun. 27, 2017

(65) Prior Publication Data

US 2017/0371163 A1 Dec. 28, 2017

Related U.S. Application Data (60) Provisional application No. 62/355,112, filed on Jun. 27, 2016.

(51) Int. Cl.
| | |
|---|---|
| G06T 1/00 | (2006.01) |
| G02B 27/01 | (2006.01) |
| G02B 26/08 | (2006.01) |
| G06T 19/00 | (2011.01) |
| G03H 1/26 | (2006.01) |
| G03H 1/22 | (2006.01) |

(52) U.S. Cl.
CPC ..... *G02B 27/0172* (2013.01); *G02B 26/0833* (2013.01); *G03H 1/2205* (2013.01); *G03H 1/2294* (2013.01); *G03H 1/2645* (2013.01); *G06T 19/006* (2013.01); *G02B 2027/0174* (2013.01); *G03H 2001/2221* (2013.01); *G03H 2001/2242* (2013.01); *G03H 2001/2284* (2013.01); *G03H 2225/21* (2013.01); *G03H 2225/24* (2013.01); *G03H 2227/02* (2013.01)

(58) Field of Classification Search
CPC ........ G02B 2027/0174; G02B 26/0833; G06T 19/006; G03H 2225/21
USPC ......................................................... 345/419
See application file for complete search history.

(56) References Cited

U.S. PATENT DOCUMENTS

| 10,025,174 B1* | 7/2018 | Tait ...................... H04N 13/363 |
| 2004/0056824 A1* | 3/2004 | Sudo .................. G02B 27/2264 345/7 |
| 2010/0067086 A1* | 3/2010 | Khan ....................... G02B 5/12 359/239 |

(Continued)

*Primary Examiner* — Thomas J Lett
(74) *Attorney, Agent, or Firm* — Schwegman Lundberg & Woessner, P.A.

(57) ABSTRACT

An augmented reality display device (such as a head mounted device) includes a partially transparent and partially reflective lens, a laser light source, a radio frequency source, a display controller, an acousto-optical modulator, and a microelectromechanical (MEMS) device. The laser light source generates light. The radio frequency (RF) source generates a RF signal. The display controller generates a synchronization signal. The acousto-optical modulator receives at least a portion of the light, modulates the light based on the RF signal, and provides modulated light. The MEMS device receives the synchronization signal from the display controller and reflects the modulated light towards the partially transparent and partially reflective lens. The MEMS device determines a direction in which the modulated light reflects based on the synchronization signal and the partially transparent and partially reflective lens reflecting the modulated laser light towards an eye of a user of the augmented realty display device.

20 Claims, 8 Drawing Sheets

(56) References Cited

U.S. PATENT DOCUMENTS

| | | | |
|---|---|---|---|
| 2011/0037953 A1* | 2/2011 | Nizani | G02B 3/005 |
| | | | 353/38 |
| 2013/0128364 A1* | 5/2013 | Wheeler | A61B 3/113 |
| | | | 359/630 |
| 2013/0222384 A1* | 8/2013 | Futterer | G02B 5/32 |
| | | | 345/426 |
| 2013/0321823 A1* | 12/2013 | Takahashi | G01B 11/24 |
| | | | 356/601 |
| 2017/0299869 A1* | 10/2017 | Urey | A61B 3/032 |
| 2018/0252925 A1* | 9/2018 | Schowengerdt | G06T 13/40 |

* cited by examiner

NEAR EYE DIFFRACTIVE HOLOGRAPHIC PROJECTION METHOD

RELATED APPLICATION

This application claims the benefit of priority of U.S. Provisional Application No. 62/355,112, filed Jun. 27, 2016, which is herein incorporated by reference in its entirety.

TECHNICAL FIELD

The subject matter disclosed herein generally relates to an augmented reality display device. Specifically, the present disclosure addresses systems and methods for a transparent parabolic reflector of an augmented reality device.

BACKGROUND

Holography enables three-dimensional (3D) images to be recorded in an optical medium for later reconstruction and display. Typically, a hologram is constructed by optical interference of two coherent laser beams in a film or a grating. As such, the laser recording imparts static optical properties such as fixed depth encoded lights in the grating. The characteristics of the grating do not change once the recording is performed. As such, static optical properties of gratings can be difficult to use in Augmented Reality (AR) devices since the user's relative position is dynamic. AR devices allow users to observe a scene while simultaneously seeing relevant virtual content that may be aligned to items, images, objects, or environments in the field of view of the device or user. However, the user may move the devices relative to the items and stationary objects in space. Since the depth of field for the virtual content is fixed based on the recorded grating, the user may perceive a disparity between the real object and the virtual content.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Example methods and systems are directed an augmented reality display device including a transparent parabolic reflector. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
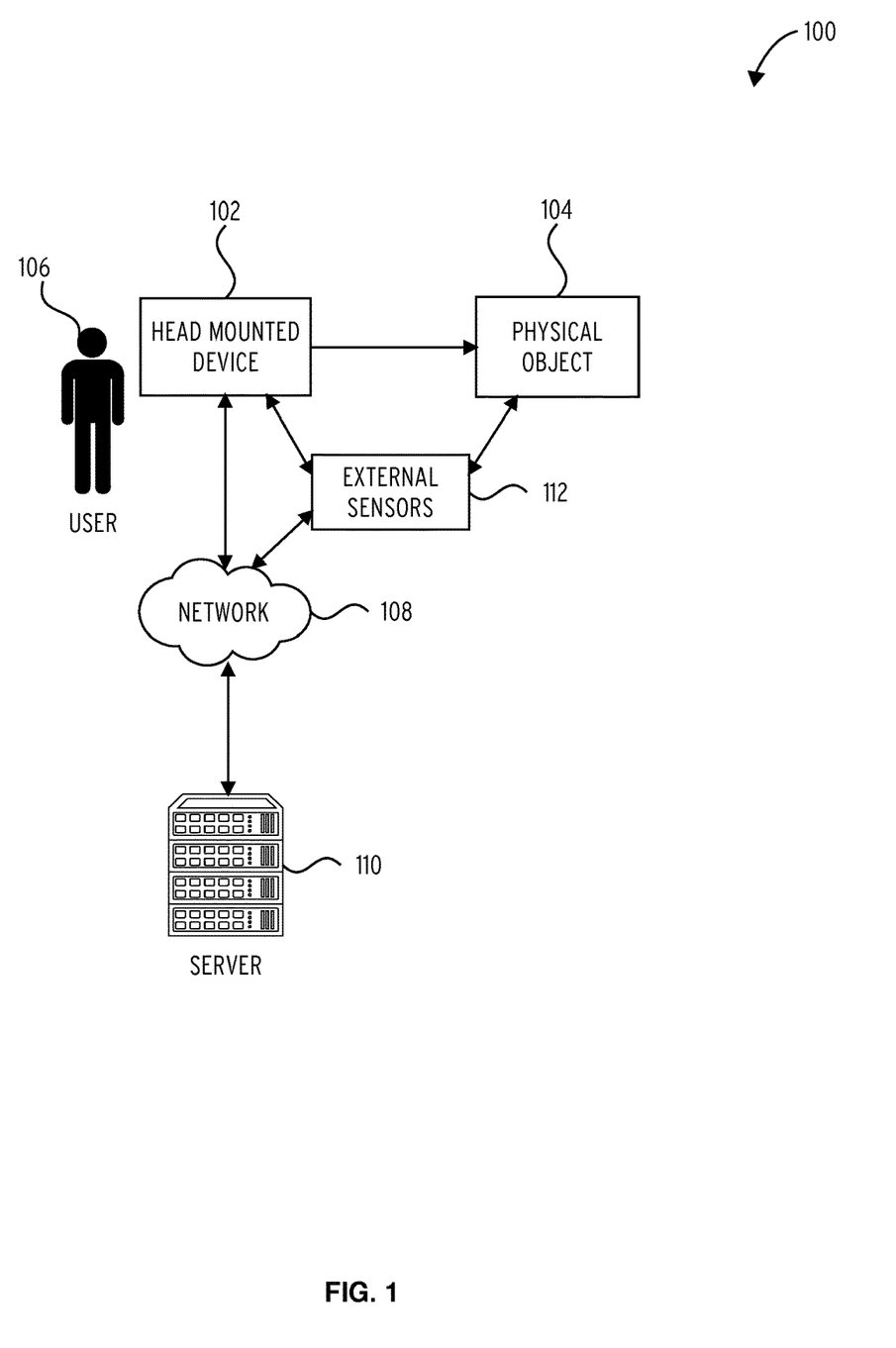
FIG. 1 is a block diagram illustrating an example of a network environment suitable for an augmented reality user interface, according to some example embodiments.

FIG. 1 is a block diagram illustrating an example of a network environment suitable for an augmented reality user interface, according to some example embodiments. A network environment 100 includes a head mounted device 102 and a server 110, communicatively coupled to each other via a network 108. The head mounted device 102 and the server 110 may each be implemented in a computer system, in whole or in part, as described below with respect to FIG. 6.

The server 110 may be part of a network-based system. For example, the network-based system may be or include a cloud-based server system that provides additional information, such as 3D models or other virtual objects, to the head mounted device 102.

A user 106 may wear the head mounted device 102 and look at a physical object 104 in a real world physical environment. The user 106 may be a human user (e.g., a human being), a machine user (e.g., a computer configured by a software program to interact with the head mounted device 102), or any suitable combination thereof (e.g., a human assisted by a machine or a machine supervised by a human). The user 106 is not part of the network environment 100, but is associated with the head mounted device 102. For example, the head mounted device 102 may be a computing device with a camera and a transparent display such as a tablet, smartphone, or a wearable computing device (e.g., helmet or glasses). In another example embodiment, the computing device may be hand held or may be removably mounted to the head of the user 106. In one example, the display may be a screen that displays what is captured with a camera of the head mounted device 102. In another example, the display of the head mounted device 102 may be transparent or semi-transparent such as in lenses of wearable computing glasses or the visor or a face shield of a helmet.

The user 106 may be a user of an AR application in the head mounted device 102 and at the server 110. The AR application may provide the user 102 with an AR experience triggered by identified objects (e.g., physical object 104) in the physical environment. For example, the physical object 104 include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment. The AR application may include computer vision recognition to determine corners, objects, lines, letters, etc.

In one example embodiment, the objects in the image are tracked and recognized locally in the head mounted device 102 using a local context recognition dataset or any other previously stored dataset of the AR application of the head mounted device 102. The local context recognition dataset module may include a library of virtual objects associated with real-world physical objects or references. In one example, the head mounted device 102 identifies feature points in an image of the physical object 104. The head mounted device 102 may also identify tracking data related to the physical object 104 (e.g., GPS location of the head mounted device 102, orientation, distance to the physical object 104). If the captured image is not recognized locally at the head mounted device 102, the head mounted device 102 can download additional information (e.g., 3D model or other augmented data) corresponding to the captured image, from a database of the server 110 over the network 108.

In another example embodiment, the physical object 104 in the image is tracked and recognized remotely at the server 110 using a remote context recognition dataset or any other previously stored dataset of an AR application in the server 110. The remote context recognition dataset module may include a library of virtual objects or augmented information associated with real-world physical objects or references.

External sensors 112 may be associated with, coupled to, related to the physical object 104 to measure a location, status, and characteristics of the physical object 104. Examples of measured readings may include and but are not limited to weight, pressure, temperature, velocity, direction, position, intrinsic and extrinsic properties, acceleration, and dimensions. For example, external sensors 112 may be disposed throughout a factory floor to measure movement, pressure, orientation, and temperature. The external sensors 112 can also be used to measure a location, status, and characteristics of the head mounted device 102 and the user 106. The server 110 can compute readings from data generated by the external sensors 112. The server 110 can generate virtual indicators such as vectors or colors based on data from external sensors 112. Virtual indicators are then overlaid on top of a live image or a view of the physical object 104 in a line of sight of the user 106 to show data related to the object 116. For example, the virtual indicators may include arrows with shapes and colors that change based on real-time data. The visualization may be provided to the physical object 104 so that the head mounted device 102 can render the virtual indicators in a display of the head mounted device 102. In another example embodiment, the virtual indicators are rendered at the server 110 and streamed to the head mounted device 102.

The external sensors 112 may include other sensors used to track the location, movement, and orientation of the head mounted device 102 externally without having to rely on sensors internal to the head mounted device 102. The sensors 112 may include optical sensors (e.g., depth-enabled 3D camera), wireless sensors (Bluetooth, Wi-Fi), GPS sensors, and audio sensors to determine the location of the user 106 wearing the head mounted device 102, distance of the user 106 to the external sensors 112 (e.g., sensors placed in corners of a venue or a room), the orientation of the head mounted device 102 to track what the user 106 is looking at (e.g., direction at which the head mounted device 102 is pointed, e.g., head mounted device 102 pointed towards a player on a tennis court, head mounted device 102 pointed at a person in a room).

In another example embodiment, data from the external sensors 112 and internal sensors in the head mounted device 102 may be used for analytics data processing at the server 110 (or another server) for analysis on usage and how the user 106 is interacting with the physical object 104 in the physical environment. Live data from other servers may also be used in the analytics data processing. For example, the analytics data may track at what locations (e.g., points or features) on the physical or virtual object the user 106 has looked, how long the user 106 has looked at each location on the physical or virtual object, how the user 106 wore the head mounted device 102 when looking at the physical or virtual object, which features of the virtual object the user 106 interacted with (e.g., such as whether the user 106 engaged with the virtual object), and any suitable combination thereof. The head mounted device 102 receives a visualization content dataset related to the analytics data. The head mounted device 102 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 19. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
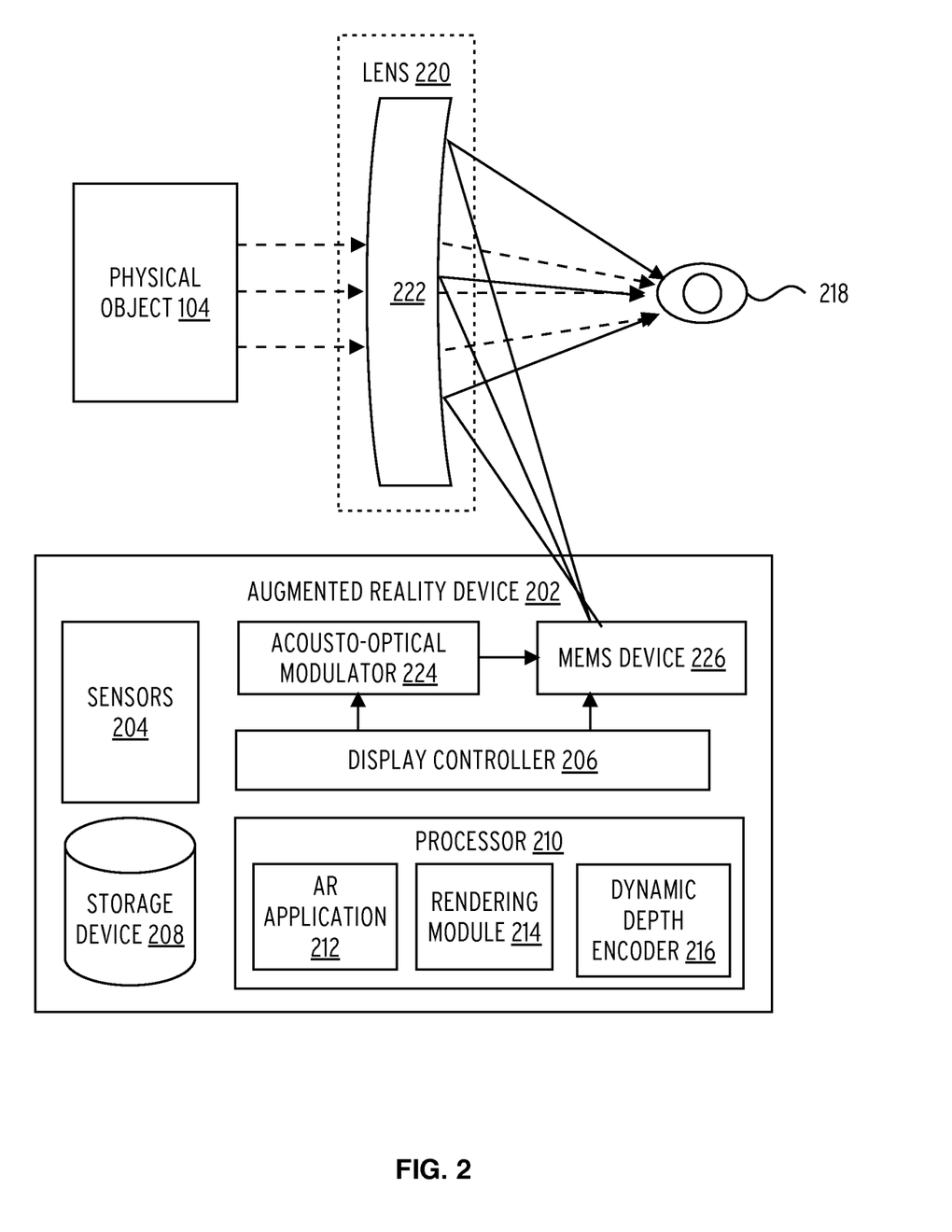
FIG. 2 is a block diagram illustrating an example embodiment of components of a head mounted device.

FIG. 2 is a block diagram illustrating an example embodiment of modules (e.g., components) of the head mounted device 102. The head mounted device 102 (e.g., a helmet, a visor, or any other device mounted to a head for the user 106) includes an augmented reality device 202 and a lens 220. In one example, the lens 220 transmits light coming from the physical object 104 but also reflects light coming from a MEM device 226. The lens 220 may include, for example, a visor or transparent face shield positioned in front of the eyes of the user 106. In one example embodiment, the lens 220 includes a partially transparent parabolic reflector 222 or mirror. The partially transparent parabolic reflector 222 includes a convex side and a concave side. A reflective coating material, such as silver, may be applied to the concave side of the partially transparent parabolic reflector 222 to enable the lens 220 to reflect light from the augmented reality device 202 towards an eye 218 of the user 106. In another example embodiment, the partially transparent parabolic reflector 222 has a focus point positioned at or around the eye 218.

The augmented reality device 202 includes sensors 204, a processor 210, a display controller 206, an acousto-optical modulator (AOM) 224, a (Micro-Electro Mechanical) MEMS device 226, and a storage device 208. The augmented reality device 202 may generate a light signal projected onto the lens 220. The lens 220 combines light reflected from the augmented reality device 202 with light reflected off the physical object 104 towards the eye 218 of the user 106.

The sensors 204 include, for example, a thermometer, an infrared camera, a barometer, a humidity sensor, an EEG (electroencephalogram) sensor, a proximity or location sensor (e.g, near field communication, global positioning system (GPS), Bluetooth, Wifi), an optical sensor (e.g., camera), an orientation sensor (e.g., gyroscope), an audio sensor (e.g., a microphone), or any suitable combination thereof. For example, the sensors 204 may include a rear facing camera and a front facing camera in the augmented reality device 202. It is noted that the types of sensors described herein are for illustration purposes and the sensors 204 are thus not limited to the ones described.

The processor 210 includes an AR application 212, a rendering module 214, and a dynamic depth encoder 216. The AR application 212 receives data from sensors 204 (e.g., receive an image of the physical object 104) and identifies and recognizes the physical object 104 using machine-vision recognition techniques. The AR application 212 then retrieves, from the storage device 208, AR content associated with the physical object 104. In one example embodiment, the AR application 212 identifies a visual reference (e.g., a logo or quick response (QR) code) on the physical object (e.g., a chair) and tracks the visual reference. The visual reference may also be referred to as a marker and may consist of an identifiable image, symbol, letter, number, machine-readable code. For example, the visual reference may include a bar code, a QR code, or an image that has been previously associated with the virtual object.

The rendering module 214 renders virtual objects based on data from sensors 204. For example, the rendering module 214 renders a display of a virtual object (e.g., a door with a color based on the temperature inside the room as detected by sensors from head mounted displays (HMDs) inside the room) based on a three-dimensional model of the virtual object (e.g., 3D model of a virtual door) associated with the physical object 104 (e.g., a physical door). In another example, the rendering module 214 generates a display of the virtual object overlaid on an image of the physical object 104 captured by a camera of the augmented reality device 202. The virtual object may be further manipulated (e.g., by the user 106) by moving the physical object 104 relative to the augmented reality device 202. Similarly, the display of the virtual object may be manipulated (e.g., by the user 104) by moving the augmented reality device 202 relative to the physical object 104.

In one example embodiment, the rendering module 214 identifies the physical object 112 (e.g., a physical telephone) based on data from sensors 204 and external sensors 110, accesses virtual functions (e.g., increase or lower the volume of a nearby television) associated with physical manipulations (e.g., lifting a physical telephone handset) of the physical object 104, and generates a virtual function corresponding to a physical manipulation of the physical object 104.

In another example embodiment, the rendering module 214 determines whether the captured image matches an image locally stored in the storage device 208 that includes a local database of images and corresponding additional information (e.g., three-dimensional model and interactive features). The rendering module 214 retrieves a primary content dataset from the server 108, generates and updates a contextual content dataset based on an image captured with the augmented reality device 202.

The dynamic depth encoder 216 determines depth information of the virtual content based on the depth of the content or portion of the content relative to the lens 220. The depth information is provided to the display controller 206.

The display controller 206 includes, for example, a hardware such as a graphics card configured to generate images based on the data signals (e.g., content information and depth information) provided by the processor 210. In one example embodiment, the display controller 206 includes an RF source and a laser source. The display controller 206 is described in more details with respect to FIG. 3. The display controller 206 utilizes the depth information from the dynamic depth encoder 216 to generate the RF signal which drives the acousto-optical modulator 224. The generated surface acoustic wave in an optical element of the acousto-optical modulator 224 alters the diffraction of light through the optical element to produce a holographic image with the associated depth of field information of the content. Through acousto-optic modulation, light can be modulated through the optical element at a high rate (e.g., frequency) so that the user does not perceive individual changes in the depth of field. In another example, the dynamic depth encoder 216 adjusts the depth of field based on sensor data from the sensors 204. For example, the depth of field may be increased based on the distance between the lens 220 and the physical object 104. In another example, the depth of field may be adjusted based on a direction in which the eyes are looking.

In one example embodiment, the display controller 206 generates a synchronization signal to both the acousto-optical modulator 224 and the MEMS device 226. The synchronization signal enables the MEMS device 226 to operate and reflect corresponding individual light beams from the acousto-optical modulator 224.

The MEMS device 226 receives a projection of the holographic image (e.g., light signal) from the acousto-optical modulator 224 and reflects corresponding individual light beams to the partially transparent parabolic reflector 222. The MEMS device 226 reflects the light beams based on the synchronization signal from the display controller 206 to guide the corresponding individual light beams to the corresponding locations on the partially transparent parabolic reflector 222. The MEMS device 226 includes, for example, one or more mirrors. The position and orientation of the mirrors is controlled and adjusted based on the synchronization signal received from the display controller 206.

The reflector of the lens provides a near-eye focusing and reflection mechanism to project AR contents into the eye. The MEMS device is suggested so that subsets of the full image bouncing off each individual mirror in the MEMS array can be adjusted in timing, intensities, projection directions, appeared distance. etc. The optical path of the light ray is so small (10~20 cm, tens of nanosecond range) that the time difference of travel off each mirror is negligible, i.e. they are all sync'ed within a tolerable timing range to a grand video trigger signal generated by the AR device. All the parts to the full image in the eye are correctly stitched. Therefore, the pitch/yaw angles of the MEMS mirrors are to follow a monotonically increasing or decreasing order along each dimension.

Once the current positions of the light modulator 224, the reflector 228, the MEMS 226, and the eye 218 are obtained via feedback of their placement motors or monitoring cameras, the trajectory of the main beam is defined. Then a variation angle range for the MEMS mirror is calculated, to avoid sweeping the AR content outside the span of the reflector. This range is obtained for both sweeping angles of the mirror, i.e. pitch for horizontal and yaw for vertical.

The partially transparent parabolic reflector 222 reflects the light signals from the MEMS device 226 to the eye 218. Aluminum is usually applied by vapor deposition of thickness on the ~100 nm scale with 50% transparency. In one example embodiment, this aluminum coating can be applied on the concave side facing the user eye of lens 220. To avoid the vignette ("spyglass") effect, the aluminum coating is kept away from the edge of lens 220.

Figure 7:
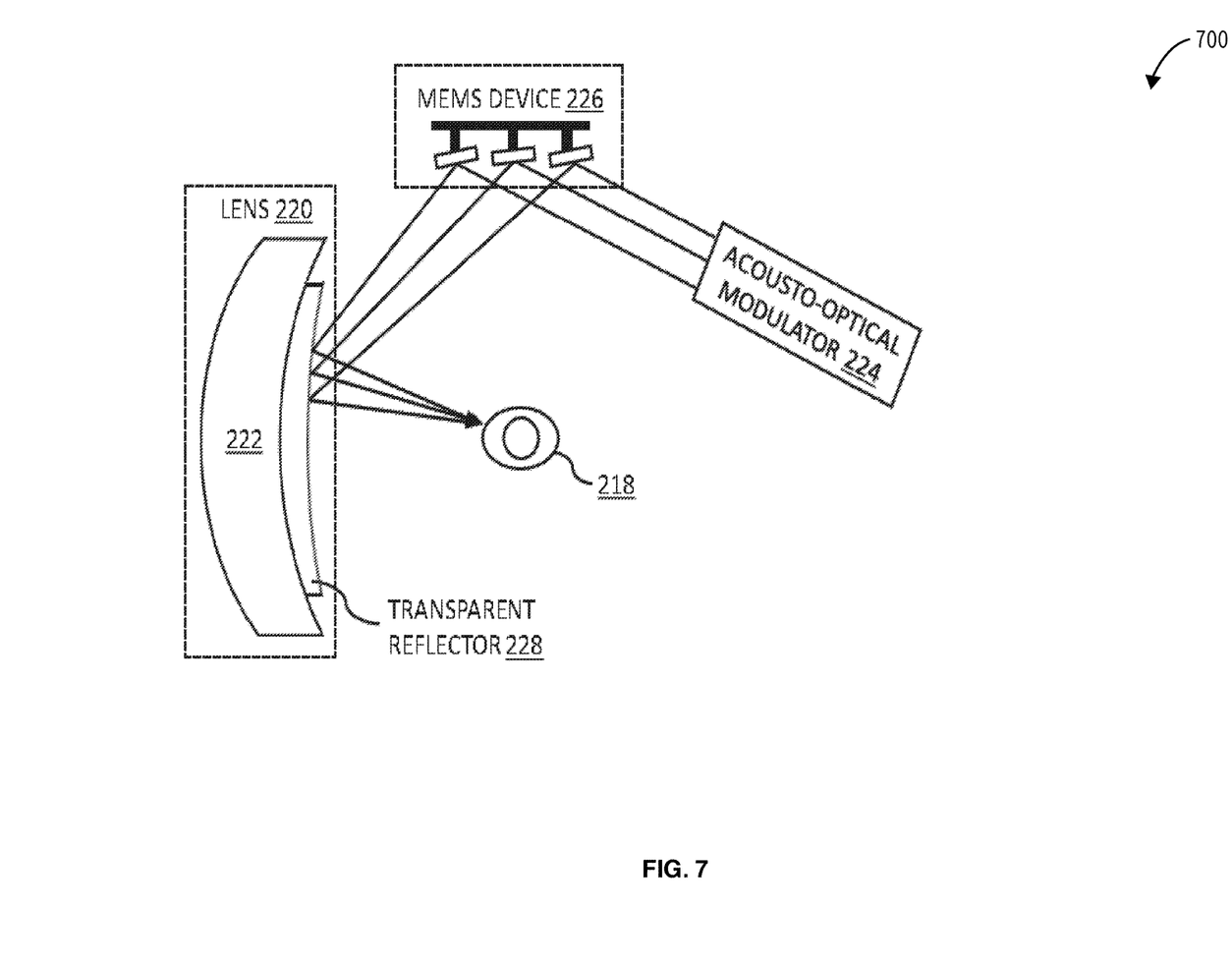
FIG. 7 is a block diagram illustrating an example embodiment of an operation of a head mounted device.
Figure 8:
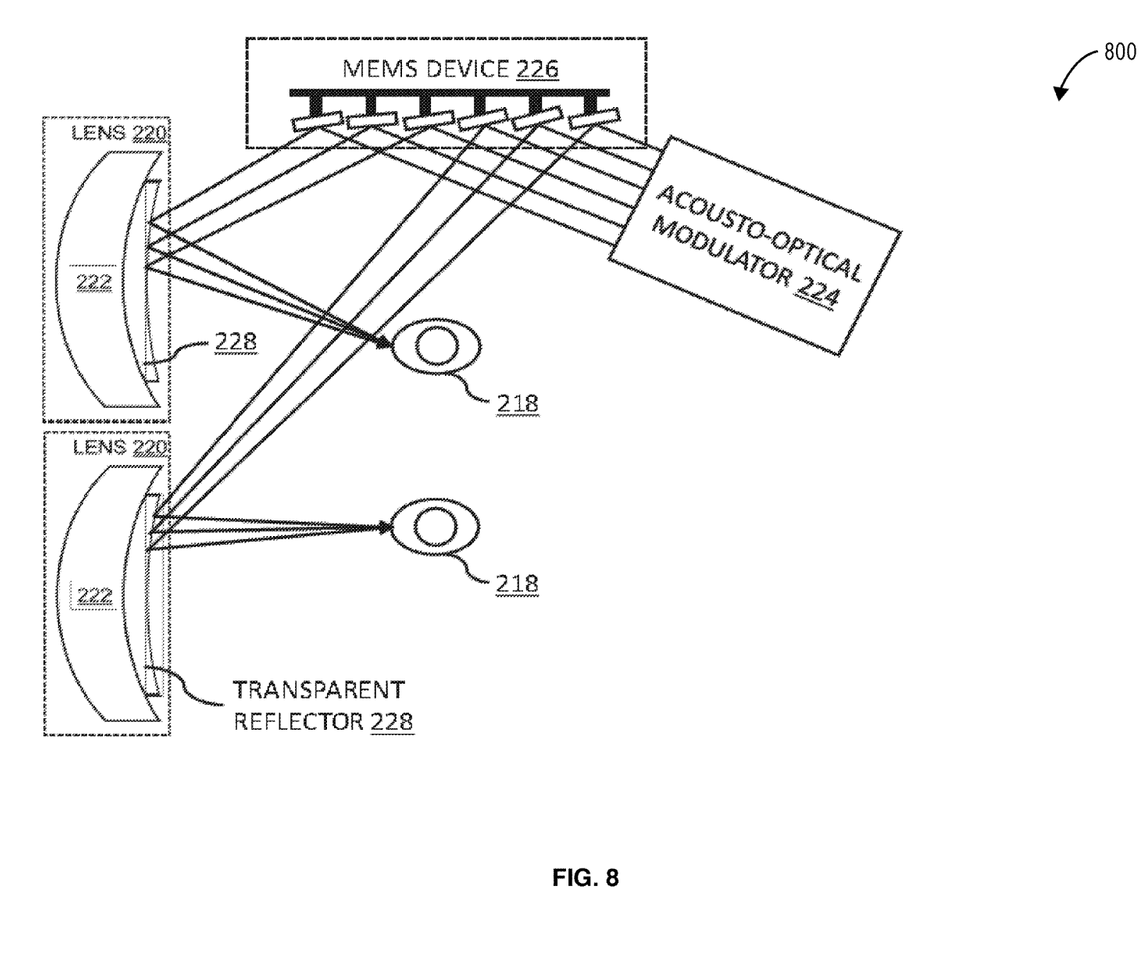
FIG. 8 is a block diagram illustrating another example embodiment of an operation of a head mounted device.

FIG. 7 is a block diagram illustrating an example embodiment of an operation of a head mounted device. FIG. 8 is a block diagram illustrating another example embodiment of an operation of a head mounted device.

The focus could potentially be adjusted by one or a combination of the following schemes:
1. Adjust the relative distance between the modulator 224 and the MEMS device 226.
2. Steering the mirrors in the MEMS device 226.
3. Move the lens 220 towards or away from the user eye.
4. Slightly stretch or bend the lens 220 (e.g. by piezoelectric motors) to change the curvature of the reflector so its focal length. The storage device 208 stores an identification of the sensors and their respective functions. The storage device 208 further includes a database of visual references (e.g., images, visual identifiers, features of images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the HMD 102 relative to the picture of the shoe. Features of the three-dimensional virtual shoe may include selectable icons on the three-dimensional virtual model of the shoe. An icon may be selected or activated using a user interface on the HMD 102.

In another example embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images of the most popular images determined by the server 110. The core set of images may include a limited number of images identified by the server 110. For example, the core set of images may include the images depicting covers of the ten most popular magazines and their corresponding experiences (e.g., virtual objects that represent the ten most popular magazines). In another example, the server 110 may generate the first set of images based on the most popular or often scanned images received at the server 110. Thus, the primary content dataset does not depend on objects or images scanned by the rendering module 214 of the HMD 102.

The contextual content dataset includes, for example, a second set of images and corresponding experiences (e.g., three-dimensional virtual object models) retrieved from the server 110. For example, images captured with the HMD 102 that are not recognized (e.g., by the server 110) in the primary content dataset are submitted to the server 110 for recognition. If the captured image is recognized by the server 110, a corresponding experience may be downloaded at the HMD 102 and stored in the contextual content dataset. Thus, the contextual content dataset relies on the context in which the HMD 102 has been used. As such, the contextual content dataset depends on objects or images scanned by the rendering module 214 of the HMD 102.

In one embodiment, the HMD 102 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the HMD 102). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 3:
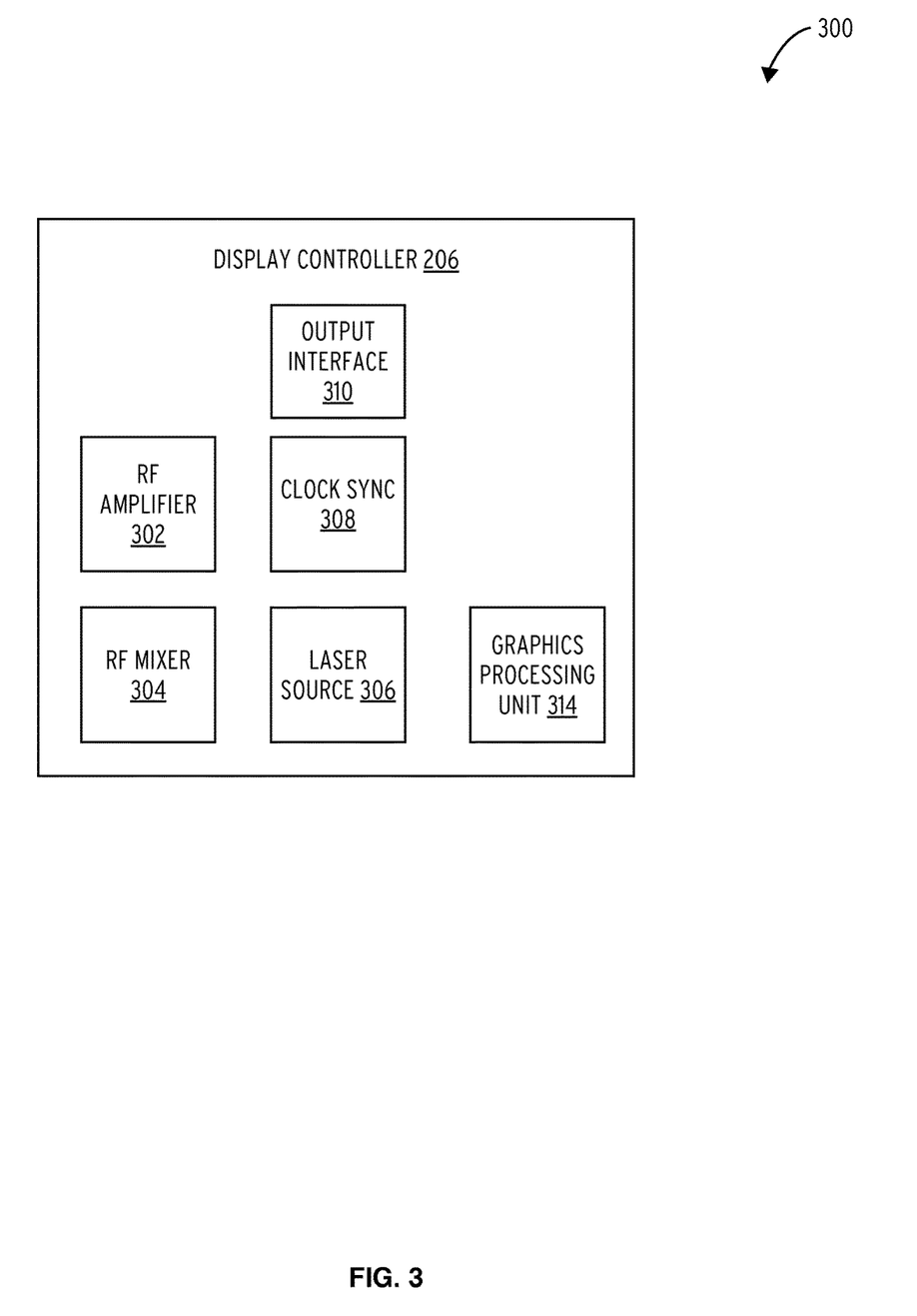
FIG. 3 is a block diagram illustrating an example embodiment of a display controller.

FIG. 3 illustrates an aspect of the subject matter in accordance with one embodiment. The display controller 206 may be implemented as a video signal generator having various components for generating the data signals communicated to the acousto-optical modulator 224. The display controller 206 includes one or more RF amplifiers 302, an RF mixer 304, one or more laser source 306, a graphics processing unit (GPU) 314, a clock sync 308, and an output interface 310. The GPU 314 renders a computer-generated-holographic (CGH) pattern for forming a hologram in the acousto-optical modulator 224. The RF mixer 304 mixes the output from the GPU 314 with a predetermined RF signal. The RF amplifiers 302 then amplify the mixed GPU output and RF signal. In an alternative embodiment, the RF amplifiers 302 amplify the RF energy before it is mixed with the GPU output. The laser source 306 generate a laser light that will be used to illuminate the hologram generated in the acousto-optical modulator 224. The clock sync 308 synchronizes the light output and the mixed RF signal, which is then output via the output interface 310 and to the acousto-optical modulator 224.

Figure 4:
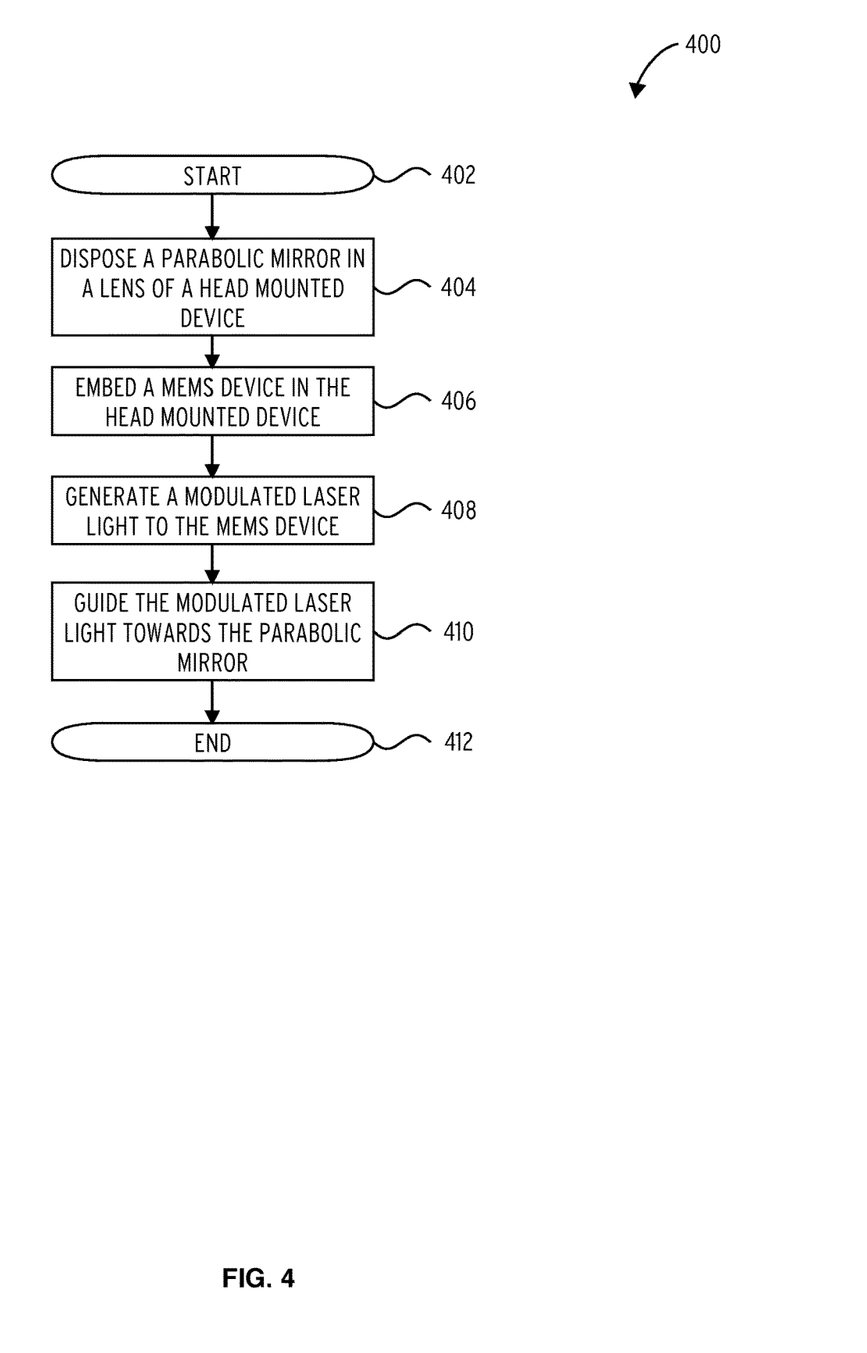
FIG. 4 is a flow diagram illustrating a method of forming a head mounted device in accordance with one embodiment.

FIG. 4 is a flow diagram illustrating a method 400 of forming a head mounted device in accordance with one embodiment. At operation 404, a parabolic reflector or mirror is disposed or formed inside a lens of a head mounted device. At operation 406, a MEMS device 226 is embedded in the head mounted device. For example, the MEMS device 226 may be disposed above the eye of the user when wearing the head mounted device. In another example, the MEMS device 226 may be disposed adjacent to the sides of the eyes of the user in the head mounted device. For the sake of simplifying the optics layout and using less mirrors, the MEMS device faces both the output of the acousto-optical modulator and the near eye lens/reflector, concave side. It could be near either the modulator or the lens, as long as the bounced hologram light has a clear path hitting the parabolic reflector. Also see Diagram 1 attached. At operation 408, the acousto-optical modulator 224 projects light signal to the MEMS device 226.

At operation 410, the MEMS device 226 reflects the projected light signal to the parabolic reflector 222. The MEMS device 226 guides the individual beam in a direction based on the synchronization signal from the display controller 206.

Figure 5:
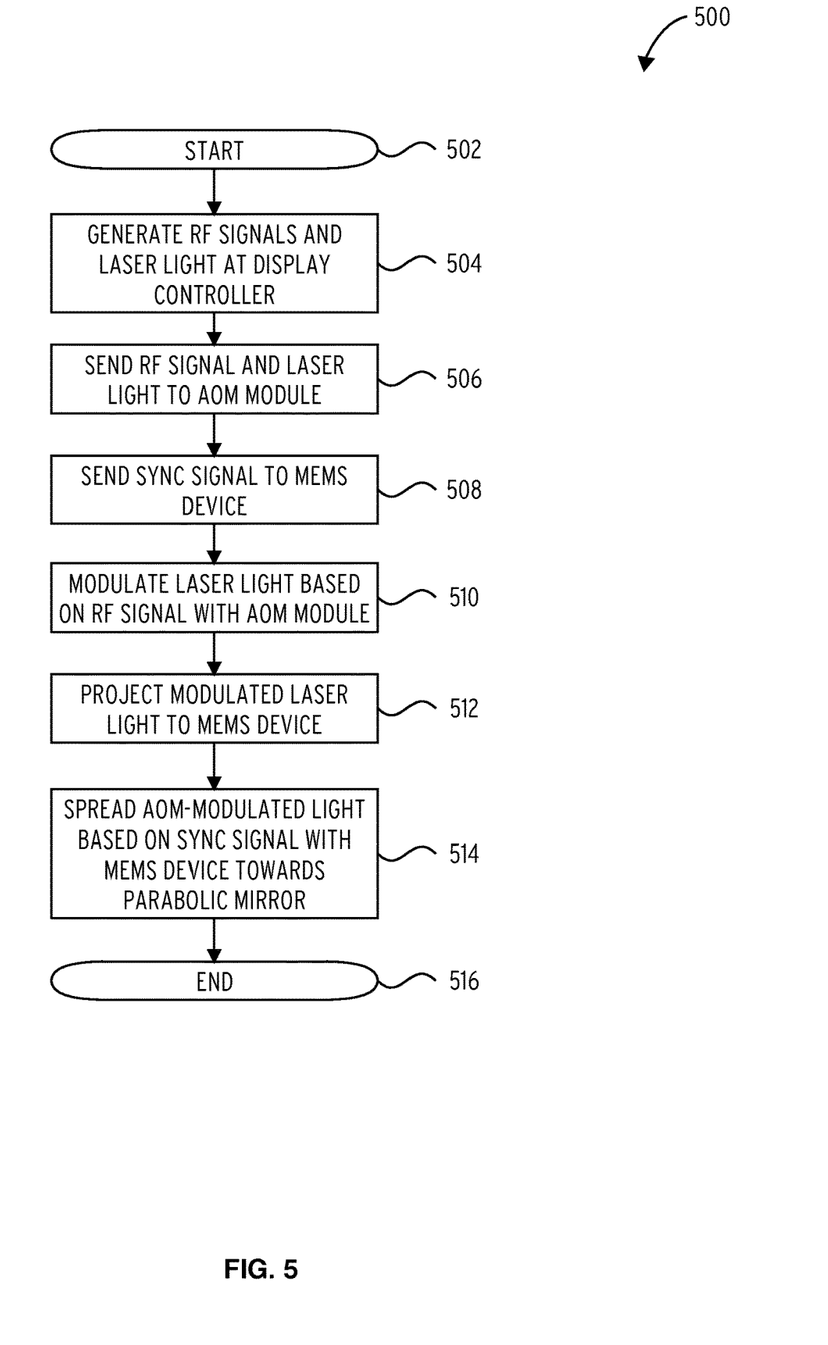
FIG. 5 is a flow diagram illustrating a method of operating a head mounted device in accordance with one embodiment.

FIG. 5 is a flow diagram illustrating a method 500 of operating a head mounted device in accordance with one embodiment. The method 500 is implemented by one or more of the components 302-314 of the display controller 206, the acousto-optical modulator 224, and the MEMS device 226 and is discussed by way of reference thereto.

Initially, at operation 504, the display controller 206 generates the RF signals and the laser light associated with the content to be displayed to the user.

At 506, the display controller 206 sends the RF signal and the laser light to the acousto-optical modulator 224. The acousto-optical modulator 224 includes an optical element whose optical properties can be modulated by the RF signal, to form the desired holographic pattern necessary to generate a hologram when illuminated by the laser light.

At operation 508, the display controller 206 sends a synchronization signal to the MEMS device 226.

At operation 510, the acousto-optical modulator 224 modulates the laser light to allow for generation of images of hologram based on the RF signal from the display controller 206.

At operation 512, the acousto-optical modulator 224 projects the modulated light to the MEMS device 226.

At operation 514, the MEMS device 226 reflects the beam of AOM-modulated light rapidly based on the synchronization signal from display controller 206, to a half-silvered parabolic lens (e.g., parabolic reflector 222). The holographic light is reflected off the concave side of the half-silvered parabolic lens into the user's eye 218. External light is able to pass through from the convex side of the half-silvered parabolic lens to the user's eye 218. The reflected light and the external light are combined at the user's eye 218.

Figure 6:
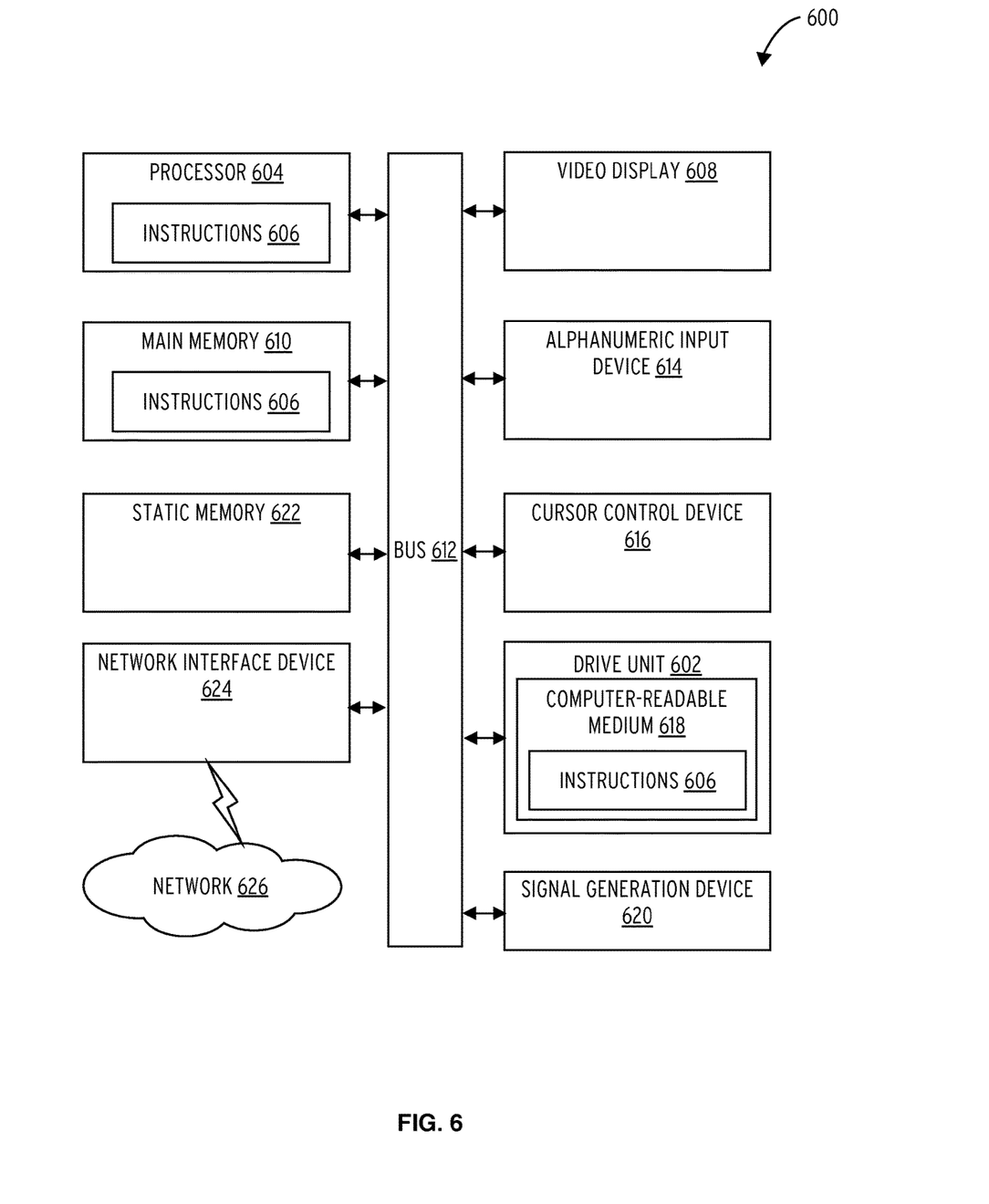
FIG. 6 a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions 606 from a computer-readable medium 618 (e.g., a non-transitory machine-readable medium, a machine-readable storage medium, a computer-readable storage medium, or any suitable combination thereof) and perform any one or more of the methodologies discussed herein, in whole or in part. Specifically, the machine 600 in the example form of a computer system (e.g., a computer) within which the instructions 606 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be communicatively coupled (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 606, sequentially or otherwise, that specify actions to be taken by that machine. Further, while only a single machine is illustrated, the term "machine" shall also be taken to include any collection of machines that individually or jointly execute the instructions 606 to perform all or part of any one or more of the methodologies discussed herein.

The machine 600 includes a processor 604 (e.g., a CPU, a graphics processing unit (GPU), a digital signal processor (DSP), an ASIC, a radio-frequency integrated circuit (RFIC), or any suitable combination thereof), a main memory 610, and a static memory 622, which are configured to communicate with each other via a bus 612. The processor 604 contains solid-state digital microcircuits (e.g., electronic, optical, or both) that are configurable, temporarily or permanently, by some or all of the instructions 606 such that the processor 604 is configurable to perform any one or more of the methodologies described herein, in whole or in part. For example, a set of one or more microcircuits of the processor 604 may be configurable to execute one or more modules (e.g., software modules) described herein. In some example embodiments, the processor 604 is a multicore CPU (e.g., a dual-core CPU, a quad-core CPU, or a 128-core CPU) within which each of multiple cores behaves as a separate processor that is able to perform any one or more of the methodologies discussed herein, in whole or in part. Although the beneficial effects described herein may be provided by the machine 600 with at least the processor 604, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 600 may further include a video display 608 (e.g., a plasma display panel (PDP), a light emitting diode (LED) display, a liquid crystal display (LCD), a projector, a cathode ray tube (CRT), or any other display capable of displaying graphics or video). The machine 600 may also include an alpha-numeric input device 614 (e.g., a keyboard or keypad), a cursor control device 616 (e.g., a mouse, a touchpad, a trackball, a joystick, a motion sensor, an eye tracking device, or other pointing instrument), a drive unit 602, a signal generation device 620 (e.g., a sound card, an amplifier, a speaker, a headphone jack, or any suitable combination thereof), and a network interface device 624.

The drive unit 602 (e.g., a data storage device) includes the computer-readable medium 618 (e.g., a tangible and non-transitory machine-readable storage medium) on which are stored the instructions 606 embodying any one or more of the methodologies or functions described herein. The instructions 606 may also reside, completely or at least partially, within the main memory 610, within the processor 604 (e.g., within the processor's cache memory), or both, before or during execution thereof by the machine 600. Accordingly, the main memory 610 and the processor 604 may be considered machine-readable media (e.g., tangible and non-transitory machine-readable media). The instructions 606 may be transmitted or received over a computer network 626 via the network interface device 624. For example, the network interface device 624 may communicate the instructions 606 using any one or more transfer protocols (e.g., hypertext transfer protocol (HTTP)).

In some example embodiments, the machine 600 may be a portable computing device (e.g., a smart phone, tablet computer, or a wearable device), and have one or more additional input components (e.g., sensors or gauges). Examples of such input components include an image input component (e.g., one or more cameras), an audio input component (e.g., one or more microphones), a direction input component (e.g., a compass), a location input component (e.g., a GPS receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the computer-readable medium 618 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 606 for execution by the machine 600, such that the instructions 606, when executed by one or more processors of the machine 600 (e.g., processor 604), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 606 for execution by the machine 600 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 606).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumated embodiments describe various example embodiments of methods, machine-readable media, and systems (e.g., machines, devices, or other apparatus) discussed herein.

A first embodiment provides an augmented reality display device comprising:
a partially transparent and partially reflective lens;
a laser light source configured to generate light;
a radio frequency source configured to generate a radio frequency (RF) signal;
a display controller configured to generate a synchronization signal;
an acousto-optical modulator configured to receive at least a portion of the light, modulate the light based on the radio frequency signal, and provide modulated light; and
a microelectromechanical (MEMS) device configured to receive the synchronization signal from the display controller and reflect the modulated light towards the partially transparent reflective lens, the MEMS device determining a direction in which the modulated light reflects based on the synchronization signal and the partially transparent and partially reflective lens reflecting the modulated laser light towards an eye of a user of the augmented realty display device.

A second embodiment provides a device according to the first embodiment, wherein the partially transparent reflective lens comprises a parabolic lens including a concave side, a convex side, and a partially reflective layer applied to the concave side, wherein the parabolic lens forms a focus point located about the eye of the user.

A third embodiment provides a device according to the first embodiment, wherein the partially transparent and partially reflective lens combines an external light reflected off a physical object with the modulated laser light at the eye of the user A second embodiment provides a device according to the first embodiment, further comprising:
one or more processors comprising an augmented reality application configured to generate augmented reality content and to send a data signal of the augmented reality content to the display controller.

A fifth embodiment provides a device according to the fourth embodiment, wherein the augmented reality application comprises:
a recognition module configured to identify a physical object imaged by a camera of the augmented reality display device;
a rendering module configured to retrieve the augmented reality content associated with the physical object; and
a dynamic depth encoder configured to identify a depth of the physical object and encode a depth of the augmented reality content into the RF signal, the depth of the augmented reality content being coded based on the depth of the physical object.

A sixth embodiment provides a device according to the fifth embodiment, wherein the display controller comprises:
a graphics processing unit (GPU) configured to render an image of the augmented reality content and generate a GPU output signal corresponding to the rendered image;
an RF source configured to generate the RF signal;
an RF mixer configured to mix the GPU output signal with the RF signal; and
a laser source configured to generate the laser light based on the mixed GPU output signal.

A seventh embodiment provides a device according to the first embodiment, wherein the display controller comprises:
a graphics processing unit (GPU) configured to render an image of an augmented reality content and generate a GPU output signal corresponding to the rendered image, the augmented reality content independent of data from a camera of the augmented reality display device;
an RF source configured to generate the RF signal;
an RF mixer configured to mix the GPU output signal with the RF signal; and
a laser source configured to generate the laser light based on the mixed GPU output signal.

An eight embodiment provides a device according to the first embodiment, wherein the display controller comprises:
a graphics processing unit (GPU) configured to render an image of an augmented reality content and generate a GPU output signal corresponding to the rendered image, a depth of the rendered image independent of data from a camera of the augmented reality display device;

an RF source configured to generate the RF signal;

an RF mixer configured to mix the GPU output signal with the RF signal; and a laser source configured to generate the laser light based on the mixed GPU output signal.

A ninth embodiment provides a device according to the first embodiment, wherein the MEMS device is synchronized with the display controller via a reference timing, the reference timing further synchronizing the display controller with the acousto-optical modulator.

A tenth embodiment provides a device according to the first embodiment, wherein the MEMS device reflects and spreads a single beam of the modulated laser light in different directions based on the RF signal towards the partially transparent reflective lens.

What is claimed is:

1. An augmented reality display device comprising:
   a partially transparent and partially reflective lens;
   a laser light source configured to generate light;
   a radio frequency source configured to generate a radio frequency (RF) signal;
   a display controller configured to generate a synchronization signal;
   an acousto-optical modulator configured to receive at least a portion of the light, modulate the light based on the radio frequency signal, and provide modulated light; and
   a microelectromechanical (MEMS) device configured to receive the synchronization signal from the display controller and reflect the modulated light towards the partially transparent reflective lens, the MEMS device determining a direction in which the modulated light reflects based on the synchronization signal and the partially transparent and partially reflective lens reflecting the modulated laser light towards an eye of a user of the augmented realty display device.

2. The augmented reality display device of claim 1, wherein the partially transparent reflective lens comprises a parabolic lens including a concave side, a convex side, and a partially reflective layer applied to the concave side, wherein the parabolic lens forms a focus point located about the eye of the user.

3. The augmented reality display device of claim 1, wherein the partially transparent and partially reflective lens combines an external light reflected off a physical object with the modulated laser light at the eye of the user.

4. The augmented reality display device of claim 1, further comprising:
   one or more processors configured to generate augmented reality content and to send a data signal of the augmented reality content to the display controller.

5. The augmented reality display device of claim 4, wherein the one or more processors are further configured to:
   identify a physical object imaged by a camera of the augmented reality display device;
   retrieve the augmented reality content associated with the physical object; and
   identify a depth of the physical object and encode a depth of the augmented reality content into the RF signal, the depth of the augmented reality content being coded based on the depth of the physical object.

6. The augmented reality display device of claim 5, wherein the display controller comprises:

a graphics processing unit (GPU) configured to render an image of the augmented reality content and generate a GPU output signal corresponding to the rendered image;
   an RF source configured to generate the RF signal;
   an RF mixer configured to mix the GPU output signal with the RF signal; and
   a laser source configured to generate the laser light based on the mixed GPU output signal.

7. The augmented reality display device of claim 1, wherein the display controller comprises:
   a graphics processing unit (GPU) configured to render an image of an augmented reality content and generate a GPU output signal corresponding to the rendered image, the augmented reality content independent of data from a camera of the augmented reality display device;
   an RF source configured to generate the RF signal;
   an RF mixer configured to mix the GPU output signal with the RF signal; and
   a laser source configured to generate the laser light based on the mixed GPU output signal.

8. The augmented reality display device of claim 1, wherein the display controller comprises:
   a graphics processing unit (GPU) configured to render an image of an augmented reality content and generate a GPU output signal corresponding to the rendered image, a depth of the rendered image independent of data from a camera of the augmented reality display device;
   an RF source configured to generate the RF signal;
   an RF mixer configured to mix the GPU output signal with the RF signal; and
   a laser source configured to generate the laser light based on the mixed GPU output signal.

9. The augmented reality display device of claim 1, wherein the MEM S device is synchronized with the display controller via a reference timing, the reference timing further synchronizing the display controller with the acousto-optical modulator.

10. The augmented reality display device of claim 1, wherein the MEMS device reflects and spreads a single beam of the modulated laser light in different directions based on the RF signal towards the partially transparent reflective lens.

11. A method of forming a holographic image at a head mounted device, the method comprising:
    generating a radiofrequency (RF) signal, a laser light, and a synchronization signal at a display controller of the head mounted device;
    receiving the RF signal and the laser light at an acousto-optical modulator;
    modulating the laser light based on the RF signal at the acousto-optical modulator;
    projecting the modulated laser light to a microelectromechanical system (MEMS) device;
    providing the synchronization signal and the modulated laser light to the MEMS device; and
    directing the MEMS device to reflect the modulated laser light in a direction based on the synchronization signal towards a partially transparent and partially reflective lens of the head mounted device, the partially transparent reflective lens reflecting the modulated laser light towards an eye of a user of the head mounted device.

12. The method of claim 11, wherein the partially transparent and partially reflective lens comprises a parabolic lens including a concave side, a convex side, and a reflective layer applied to the concave side, wherein the parabolic lens forms a focus point located about the eye of the user.

13. The method of claim 11, wherein the partially transparent and partially reflective lens combines an external light reflected off a physical object with the modulated laser light at the eye of the user.

14. The method of claim 11, further comprising:
generating an augmented reality content with an augmented reality application implemented in one or more processors in the head mounted device;
sending data signal of the augmented reality content to the display controller.

15. The method of claim 14, further comprising:
identifying a physical object imaged by a camera of the augmented reality display device;
retrieving the augmented reality content associated with the physical object;
identifying a depth of the physical object; and
encoding a depth of the augmented reality content into the RF signal, the depth of the augmented reality content being coded based on the depth of the physical object.

16. The method of claim 15, further comprising:
rendering an image of the augmented reality content with a Graphical Processing Unit (GPU);
generating a GPU output signal corresponding to the rendered image;
generating the RF signal with an RF source;
mixing the GPU output signal with the RF signal using an RF mixer; and
generating the laser light based on the mixed GPU output signal.

17. The method of claim 11, further comprising:
rendering an image of an augmented reality content with a GPU;
generating a GPU output signal corresponding to the rendered image, the augmented reality content independent of data from a camera of the augmented reality display device;
generating the RF signal with an RF source;
mixing the GPU output signal with the RF signal using an RF mixer; and
generating the laser light based on the mixed GPU output signal.

18. The method of claim 11, further comprising:
rendering an image of an augmented reality content with a GPU;
generating a GPU output signal corresponding to the rendered image, a depth of the rendered image independent of data from a camera of the augmented reality display device;
generating the RF signal with an RF source;
mixing the GPU output signal with the RF signal using an RF mixer; and
generating the laser light based on the mixed GPU output signal.

19. The method of claim 11, further comprising:
synchronizing the MEMS device with the display controller via a reference timing and
synchronizing the display controller with the acousto-optical modulator using the reference timing.

20. A non-transitory computer-readable storage medium, the computer-readable storage medium including instructions that, when executed by a computer, cause the computer to:
generate an RF signal, a laser light, and a synchronization signal at a display controller of the head mounted device;
receive the RF signal and the laser light at an acousto-optical modulator;
modulate the laser light based on the RF signal at the acousto-optical modulator;
project the modulated laser light to a microelectromechanical system (MEMS) device;
provide the synchronization signal and the modulated laser light to the MEMS device; and
direct the MEMS device to reflect the modulated laser light in a direction based on the synchronization signal towards a partially transparent and partially reflective lens of the head mounted device, the partially transparent reflective lens reflecting the modulated laser light towards an eye of a user of the head mounted device.

* * * * *